United States Patent
Staelin et al.

(10) Patent No.: US 6,803,933 B1
(45) Date of Patent: Oct. 12, 2004

(54) SYSTEMS AND METHODS FOR DOT GAIN DETERMINATION AND DOT GAIN BASED PRINTING

(75) Inventors: Carl Staelin, Haifa (IL); Ruth Bergman, Haifa (IL); Mani Fischer, Haifa (IL); Darryl Greig, Haifa (IL); Marie Vans, Shefar-am (IL); Gregory Braverman, Ramat-Gan (IL); Shlomo Harush, Nes-Ziona (IL); Eyal Shelef, Tel-Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/463,371

(22) Filed: Jun. 16, 2003

(51) Int. Cl.$^7$ .............................................. B41J 2/385
(52) U.S. Cl. ...................... 347/131; 358/1.2; 358/1.9; 358/3.23; 182/155; 182/156
(58) Field of Search ................................ 347/131, 115, 347/116; 358/1.2, 1.9, 2.1, 3.12, 3.23; 382/155, 156, 159, 162; 345/601, 619

(56) References Cited

U.S. PATENT DOCUMENTS

| | | | |
|---|---|---|---|
| 5,255,085 A | | 10/1993 | Spence |
| 5,612,902 A | * | 3/1997 | Stokes .......................... 358/504 |
| 5,943,477 A | * | 8/1999 | Rao et al. .................... 358/502 |
| 5,967,050 A | * | 10/1999 | Seymour ..................... 101/484 |
| 6,027,201 A | * | 2/2000 | Edge ............................ 347/19 |
| 6,134,344 A | | 10/2000 | Burges |
| 6,232,954 B1 | * | 5/2001 | Rozzi .......................... 345/601 |
| 6,243,100 B1 | * | 6/2001 | Curry et al. ................. 345/619 |
| 6,435,654 B1 | * | 8/2002 | Wang et al. .................. 347/43 |
| 6,499,402 B1 | | 12/2002 | Sikes et al. |
| RE38,180 E | * | 7/2003 | Edge ............................ 347/19 |
| 6,650,771 B1 | * | 11/2003 | Walker ........................ 382/162 |
| 6,654,143 B1 | * | 11/2003 | Dalal et al. .................. 358/1.9 |
| 6,671,070 B1 | * | 12/2003 | Schildermans et al. ........ 358/69 |
| 2003/0065491 A1 | * | 4/2003 | Roberts ......................... 703/2 |
| 2004/0012647 A1 | * | 1/2004 | Sanger ......................... 347/14 |
| 2004/0032600 A1 | * | 2/2004 | Burns et al. ................. 358/1.9 |
| 2004/0125388 A1 | * | 7/2004 | Piatt et al. .................... 358/1.9 |

* cited by examiner

Primary Examiner—Eugene H. Eickholt (57) ABSTRACT

The present invention generally provides methods and systems for printing. A statistical learning system is used to determine dot gain.

23 Claims, 3 Drawing Sheets

SYSTEMS AND METHODS FOR DOT GAIN DETERMINATION AND DOT GAIN BASED PRINTING

FIELD OF THE INVENTION

The present invention related generally to systems and methods for determining dot gain.

BACKGROUND OF THE INVENTION

There typically exists a discrepancy between a digital dot area—the size of an ink dot intended to be generated by a printing apparatus—and the actual printed dot area created on the printing media. This can lead to detrimental effects in the quality of the resultant image. For example, a printer or press generally employs a fixed number of inks (for example, 1, 2, 3, 4, 5, 6, or 7 inks) and mixes different ink dots having different dot areas to achieve many more colors. If the printed dot areas are incorrect, the resultant colors or images appear incorrect.

In order to correct for this discrepancy, a dot gain table is typically used to relate printed dot area to digital dot area. To populate this table, one or more pages or swatches are printed using known digital dot areas for each color or ink. The printed dots are then measured. In this manner, a dot gain table is generated, with the points between measured points being interpolated from the measured data. In operation, the printer or press uses the measured and interpolated dot gain table to print the printed dot area desired. To keep up with drift in the press, this process needs to be performed as often as possible, and therefore requires a large number of pages for each calibration.

SUMMARY OF THE INVENTION

An embodiment of the present invention provides a method for determining dot gain. A state parameter is measured and provided as an input to a statistical learning system. Using the statistical learning system, a plurality of printed dot areas, each corresponding to a specified digital dot area, are estimated.

Another embodiment of the present invention provides a method for printing. A specified printed dot area is received, and a state parameter is input. A digital dot area corresponding to the specified printed dot area is determined using a dot gain lookup table corresponding to the input state parameter. A control signal corresponding to the determined digital dot area is generated.

BRIEF DESCRIPTION OF THE DRAWINGS

The present invention may be better understood, and its features and advantages made apparent to those skilled in the art by referencing the accompanying drawings.

DETAILED DESCRIPTION OF THE EMBODIMENTS

The present invention generally provides systems and methods for determining dot gain information based on state parameters associated with a printing apparatus or system. The dot gain information is determined using a statistical learning system in response to an input state parameter of the printing apparatus. In one embodiment the statistical learning system generates a dot gain look-up table storing the dot gain information. The statistical learning system can be trained with training samples that can include one or more of a printing system's state parameters (e.g., developer voltage, Foil age, and blanket age) as well as measured printed dot areas.

The present invention also provides apparatus, systems and methods for printing based on the determined dot gain information. The determined dot gain information can be used to generate control signals to control the printing system to generate an ink dot having a specific printed dot area given current state parameters of the printing systems. In this manner, the appropriate control signal or signals to print a particularly sized Ink dot are determined dynamically based on the present state of the printing apparatus.

In accordance with embodiments of the present invention, a representation of the dot gain information is stored and embodied in either hardware, software, or a combination thereof.

Dot gain is generally defined as:

$$\text{dot gain} = \frac{\text{printed dot area}}{\text{digital dot area}} \quad (1.1)$$

where printed dot area (also sometimes referred to as printed dot size or physical dot area) refers to the area and intensity of a printed dot on a printing medium. Printed dot areas are generally represented as a number between 0 and 100 corresponding to the percentage of the printed paper covered by the dot. Other embodiments may utilize other methods for quantifying the printed dot area, such as a numeric indicator of the dot diameter or intensity.

Digital dot area as used herein generally refers to the nominal area of ink dot as it is designed in the press software using a matrix of pixels. Printed dot areas and digital dot areas are correlated in that the printed dot area is the resultant area of ink dot actually transferred to the substrate in response to a requested digital dot area. For example, In one embodiment, a screen is provided having 200 dots per inch, each dot is accordingly $1/(200^2)$ square inches. The digital and printed dot areas are expressed as values between 0 and 100, representing between 0% and 100% coverage of that total dot area ($\frac{1}{200}^2$ sq.in.).

In one embodiment, dot gain information generated by a statistical learning system includes at least a dot gain value or a printed dot area value and a corresponding digital dot area value. The representation of the dot gain information allows a control system to access the representation and determine the digital dot area needed to generate a specified printed dot area.

In one embodiment, a dot gain look up table (LUT) is generated to correlate between the digital dot area and the printed dot area. Upon generating a dot gain table, it is possible to determine a printed dot area given a digital dot area, determine a digital dot area given a printed dot area, determine a dot gain value given either a printed or a digital dot area, and any combinations of these inquiries may be made. Further, dot gain tables may contain any number of data points, in some embodiments between 1 and 100 data points, in some embodiments between 10 and 25 data points, and in some embodiments about 17 data points. Any data points not specifically calculated in the dot gain table may be interpolated from values that have been determined.

According to one embodiment of the systems and methods of the present invention, the printed dot area corresponding to a specified digital dot area are estimated based on one or more state parameters of the printing apparatus. A look up table (LUT) based on these estimations may then be generated and used to determine the appropriate digital dot area to produce a desired printed dot area, as per normal operation of the apparatus. In some embodiments, measured printed dot areas corresponding to certain digital dot areas (or vice versa), are included in the lookup table or other representation. Values for dot areas not measured or estimated may be interpolated from estimated or measured values, in some embodiments. A control system then uses the lookup table or other representation generated by the statistical learning system to determine a digital dot area to print a received printed dot area, in some embodiments.

Figure 2:
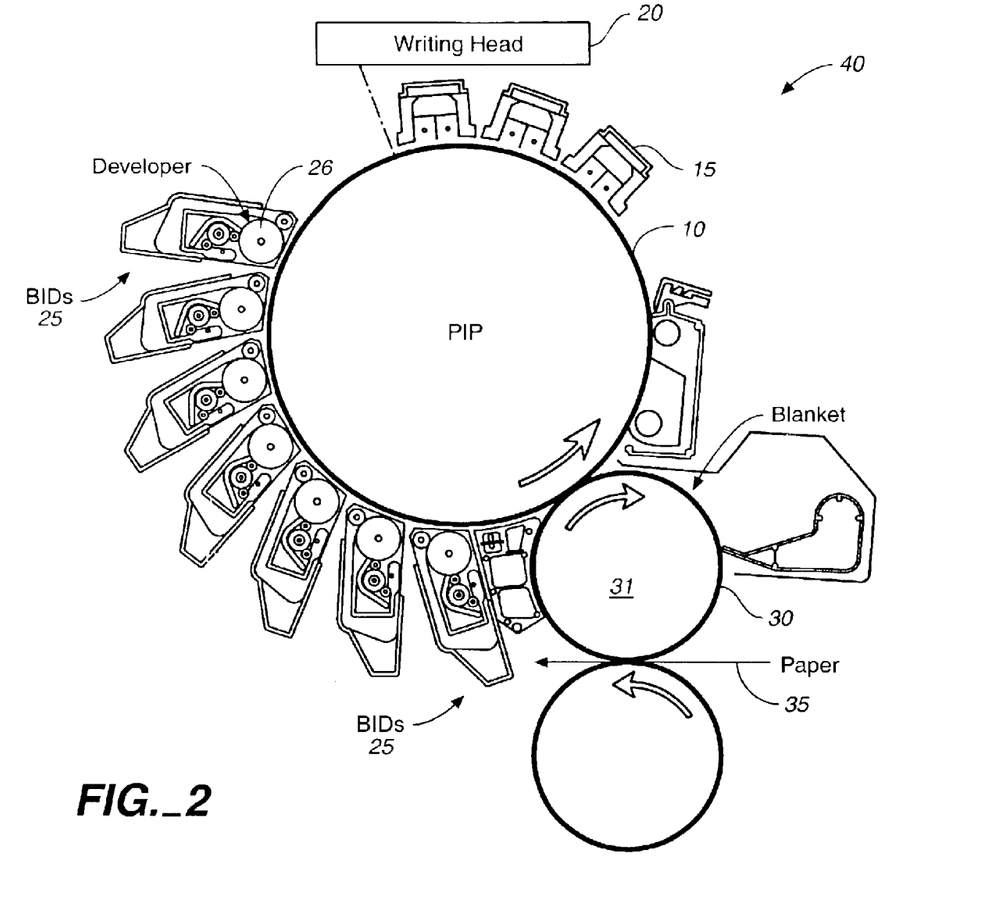
FIG. 2 depicts a schematic of a printing apparatus, according to an embodiment of the present invention.

Statistical learning systems are provided to generate a representation of dot gain information based on one or more state parameters. A state parameter, as used herein, generally refers to any parameter capable of effecting the printed dot area or printed dot area value. State parameters can include but are not limited to the type of printing media, age of various printing apparatus components including ink, rollers, blankets and films, quality of printing apparatus components, and the like. Particular state parameters used will vary according to the particular printing apparatus. With reference to FIG. 2, some exemplary parameters include: developer voltage, the voltage of the relevant BID 25; optical density, in one embodiment measured as log of the reflectance of 100% coverage of the relevant ink on the paper 35; ink density, measured as the density of ink in a relevant BID 25; ink conductivity, the conductivity of ink in a relevant BID 25; ink temperature, the temperature of the ink in a relevant BID 25; imaging oil temperature, the temperature of the imaging oil in the press separator; imaging oil dirtiness, the dirtiness of oil in the press separator; drum temperature, the temperature of the drum 31; drum blanket counter, a number of impressions made by the blanket 30 since it was replaced (or other measurement of the blanket age); foil background qualifier, the difference between the grid voltage (in the scorotron assembly 15) and the voltage induced on the PIP foil 10; machine temperature, the general temperature of the apparatus 40; corona voltage, the voltage of the corona (in the scorotron assembly 15) wire; corona current, the current in the corona (in the scorotron assembly 15) wire; grid voltage, the voltage of the grid (in the scorotron assembly 15) wire; grid current, the current in the grid wire; screen, the screening that was used in the LUT measurement procedure; foil vlight/vbackground, the voltage on the PIP foil 10 after/before it is discharged by the lasers 20.

Figure 1:
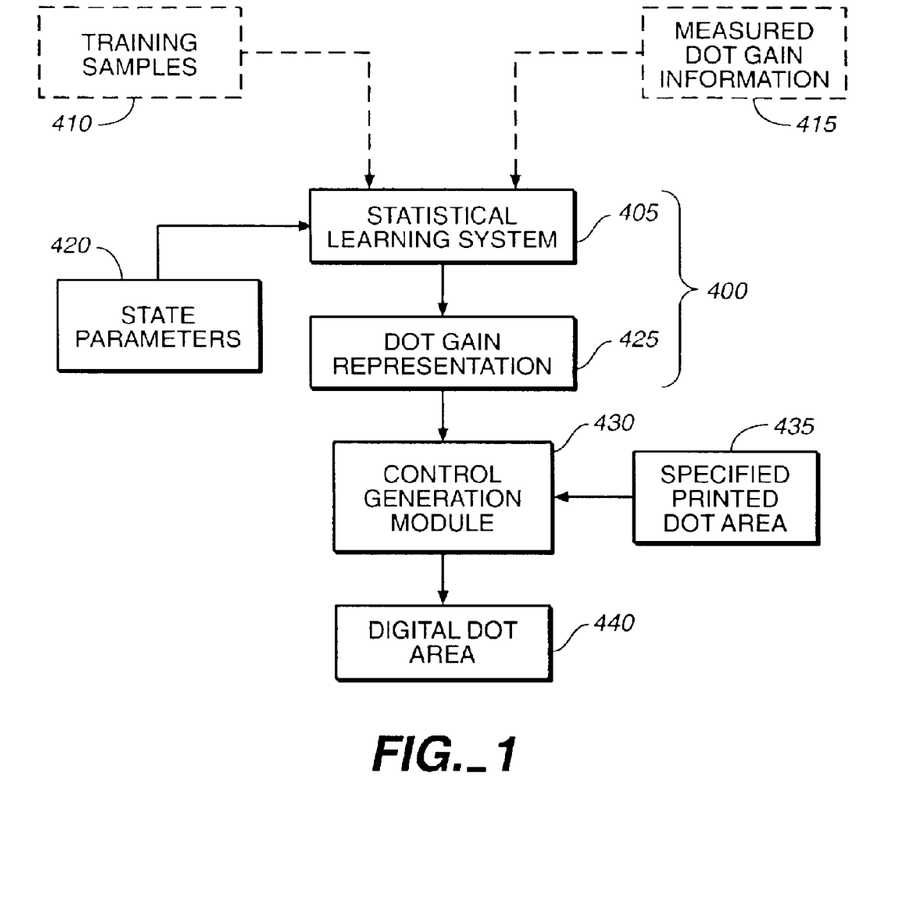
FIG. 1 depicts a schematic overview of a system for determining a digital dot area including a dot gain determiner, according to an embodiment of the present invention.

An overview of a system for determining a digital dot area, including a dot gain determinor 400, according to an embodiment of the present invention is shown in FIG. 1. Statistical learning system 405, receives state parameters 420 and is optionally provided with training samples 410 and/or measured dot gain information 415. Statistical learning system 405 accordingly generates dot gain representation 425, in one embodiment, a dot gain LUT is generated. Control generation module 430 receives specified printed dot area 435 and accesses dot gain representation 425. Based on dot gain representation 425, control generation module 430 outputs digital dot area 440 necessary to print specified printed dot area 435. In general, the system shown in FIG. 1, including dot gain determiner 400, statistical learning system 405 and control generation module 430 may be implemented in hardware, software, or combinations thereof.

One exemplary electrophotographic printing press which may be used with methods and systems of the present invention is shown in FIG. 2. The use of a printing press, or laser-driven operation, in FIG. 2 is not intended to limit the invention to digital printing presses, or printing apparatuses having a laser-driven operation. FIG. 2 is intended to be exemplary only. Briefly, a latent image is created on photoconductive foil 10 (sometimes referred to as a photoconductor drum). Foil 10 includes photo-conductive material. When exposed to light, this material becomes a conductor. Foil 10 is negatively charged by voltage assembly 15. A laser beam originating from Writing Head 20 is used to discharge specific areas on foil 10. These discharged areas comprise the latent image. Next, the latent image is developed by ink, in one embodiment Electroink, on foil 10. The Electroink contains small colored ink particles that are electrically charged. BID (Binary Ink Development) units 25, having developers, such as developer 26, apply developed ink onto the discharged areas that compose the latent image on foil 10. Finally, the image is transferred. During this stage the developed image is transferred from foil 10 to Blanket 30 that wraps Drum 31. The image is then transferred from Blanket 30 to substrate 35. The transfer of the developed image from foil 10 to Blanket 30 is achieved through electrical and mechanical forces. Blanket 30 is positively charged and is heated to about 100° C. This raises the temperature of the ink film on Blanket 30 and causes the ink particles to swell and to acquire a gelatin-like form. At this stage, the developed image is transferred from Blanket 30 to substrate 35.

Accordingly, state parameters of interest to the embodiment of a printing press shown in FIG. 2 may include, but are not limited to, printing media or substrate, developer voltage, optical density, ink density, ink conductivity, ink temperature, imaging oil temperature, imaging oil composition (or dirtiness), drum temperature, drum blanket counter, foil background qualifier, machine temperature, corona voltage, grid current, grid voltage, cold start runtime, runtime, last stop length, corona age, screen, foil counter, and foil vlight/vbackground. All or a subset of these parameters may be used by a statistical learning system, as described further below, to generate a dot gain representation associated with a state of the printing apparatus. In one embodiment, developer voltage, blanket counter, and foil counter, are used by a statistical learning system to determine a dot gain representation accurate for the present state of the press.

Figure 3:
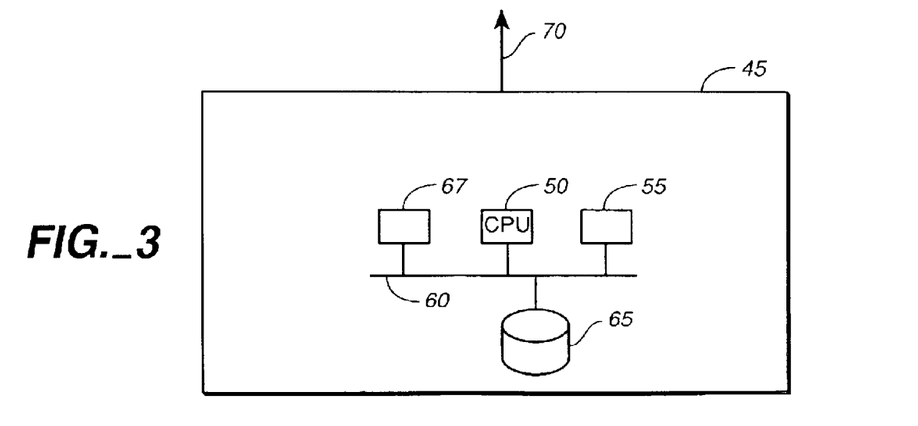
FIG. 3 depicts a computer control system, according to an embodiment of the present invention.

Generally, the printing apparatuses or presses, such as press 40 in FIG. 2, are controlled by a computer Control System 45, shown in FIG. 3. The Control System 45 communicates with the press through one or more control and/or sensor connections, such as connection 70. Control system 45 further includes CPU 50, PCI card 55, ethernet connector 67, and communicates with a disk, or other memory 65 over PCI bus 60. The PCI card 55 controls press 40, for example, by sending data to writing head 20, holds or stores dot gain representations, and performs other lowlevel control and interaction with printing apparatus hardware. Control system 45 manages flow of data from the network, or other computers or devices in communication with press 40, to the PCI card. For example, system 45 manages jobs and sends various visual data to the PCI card from associated databases as needed. In embodiments of the present invention, methods described herein are implemented in system 45. In other embodiments, methods described herein are implemented in a computer that controls system 45. In still other embodiments, methods described herein are cooperatively implemented by system 45 and other computing apparatuses in communication with system 45. In still other embodiments, methods described herein are implemented on any computing device in communication with press 40. The computer control setup in FIG. 3 is an exemplary depiction only, and is not intended to limit the invention to the particular configuration shown. In particular, a variety of communication or network methods may be used, other than or in addition to a PCI bus. Other memory modules may be used in addition to or in place of disk 65, and so on. Processor power and memory are provided in communication with press 40 to implement statistical learning methods according to the present invention and to measure or monitor state parameter data as needed for methods of the present invention.

As described above, a statistical learning system (also sometimes referred to as a 'machine learning system') is provided to determine or estimate dot gain information. The estimation or determination of the dot gain information is formulated as a regression problem, in which printed dot area is determined, or estimated, based on a variety of state parameters. A wide array of statistical learning systems may be provided to perform the above analysis including, but not limited to linear regression, support vector machines, neural networks, and genetic programming systems. Statistical learning systems are generally linear or non-linear systems for solving regression and/or classification problems. Statistical learning systems include support vector machines, neural networks, genetic programming, linear regression and the like. In general, statistical learning systems model an unknown relationship as an equation, having a set of parameters that modify the variables of interest, resulting in a solution. A statistical learning system generally 'trains' on a set of training samples to select initial parameters for use in the equation that models the output value, in this case the printed dot area or dot gain. By "training", with reference to a statistical learning system, herein is meant that one or more parameters for the system are chosen to result in agreement with a set of training samples. For example, a set of parameters is determined that, when used to modify the relevant state parameters, result in agreement with measured dot gain values. In other embodiments, however, initial parameters are simply provided for the statistical learning system, and the resultant system used to predict dot gain information.

Over time, the statistical learning system may update one or more LUTs using measured data. In some embodiments, measured printed dot areas and their corresponding digital dot areas (known points), are provided as input to the statistical learning system after any training process, and are directly included in the estimated dot gain representation. In one embodiment, two such known points are included in an estimated dot gain lookup table. In other embodiments, between one and one hundred such known points may be included in a look up table. In one embodiment, two such points are included, in one embodiment one known point corresponding to a digital dot area between 5 and 30 and a second known point corresponding to a digital dot area between 35 and 80 are included. In one embodiment, two known points are included—one corresponding to a digital dot area of 23 and another corresponding to a digital dot area of 40.

Figure 4:
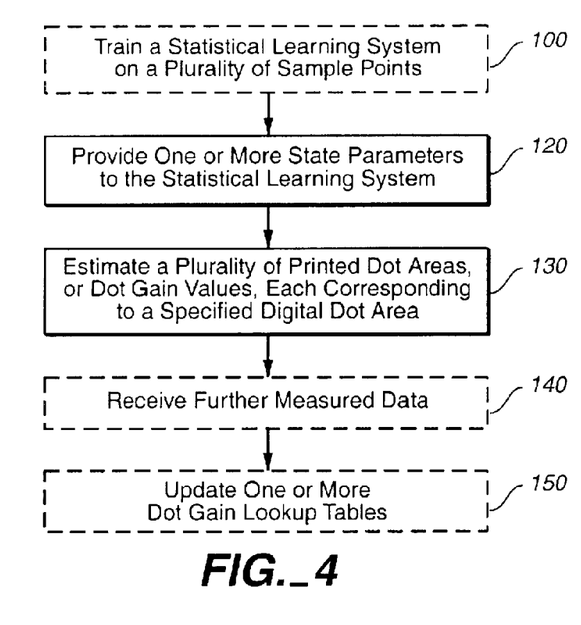
FIG. 4 depicts a schematic overview of generating a dot gain lookup table, according to an embodiment of the present invention.

FIG. 4 depicts a schematic overview of generating a dot gain lookup table, according to an embodiment of the present invention. A statistical learning system is optionally trained on a plurality of sample points, step 100. At least one state parameter is provided to the statistical learning system in step 120. A plurality of printed dot areas, or dot gain values, are estimated using the statistical learning system in step 130. In this manner, one or more dot gain tables are provided that are associated with the state of the printing apparatus. Points not specifically estimated in the table are interpolated from values in the table, in some embodiments. If any further measured data is received in step 140, such as an updated state parameter value, or a measured printed dot area (such as by optical densitometer, for example), one or more dot gain tables may be updated or generated anew in step 150.

Figure 5:
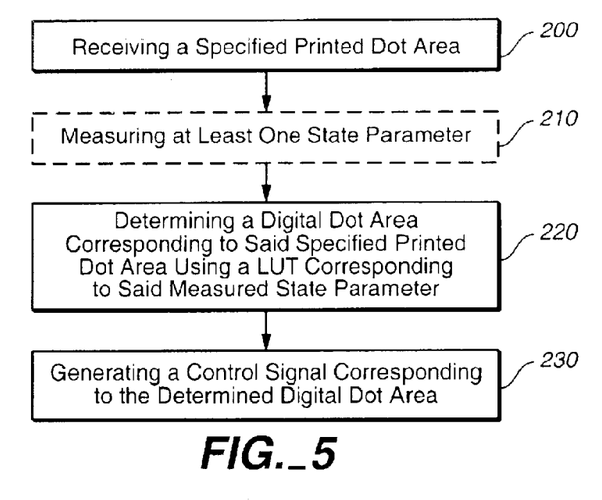
FIG. 5 depicts a schematic overview of printing according to an embodiment of the present invention.

FIG. 5 depicts a schematic overview of printing according to an embodiment of the present invention. A specified printed dot area is received in step 200. At least one state parameter is measured in step 210. Although step 210 is shown in FIG. 5 as occurring after the receipt of a specified printed dot area, in other embodiments, the state parameter is measured prior to receipt of the printed dot area to be generated. A digital dot area corresponding to the specified printed dot area is determined using a LUT corresponding to the measured state parameter in step 220, and a control signal is generated in step 230 to result in the determined digital dot area.

The present invention provides systems and methods to predict the printed dot area for each of n separations (e.g., colors) and m digital dot areas, in order to fully populate dot gain lookup tables given parameter values taken from the printing apparatus and a halftoning screen. A halftoning screen generally refers to a threshold matrix, which transforms the input continuous tone image into halftone, for example, two-tone levels. Such screens are designed specifically for each color separation and for some desired printing resolution. The halftoning screen, in one embodiment, is one of the system state parameters. In some embodiments, each screen has a different resolution and printing characteristics. Accordingly, in some embodiments, the screen type is added as an input variable and the influence of each new screen is learned separately. In one embodiment, a specific screen defines each digital dot shape and size for each tone level. Different dot shapes then may have different dot gain, even if they have the same digital dot area. In one embodiment, a single monolithic regression problem is created where one or more state parameter values, the selected screen, the separation, and digital dot area are all included as inputs, and the printed dot area is the output.

In another embodiment, separate regression problems are created for each combination of screen, separation, and digital dot area, with the machine state as input and the printed dot area as output. There are a variety of intermediate embodiments that create separate regression problems incorporating the screen, separation, and digital dot area as inputs. These embodiments trade off problem complexity with the number of models trained. In one such intermediate embodiment, a regression problem is solved separately for each color separation, digital dot area, and screen, giving n×m×s distinct models or functions, where n is the number of color separations, m is the number of sampled digital dot areas, and s are the number of screens. In another intermediate embodiment, a regression problem is solved separately for each color separation and screen, resulting in n×s models.

If calibration samples are taken on the printing apparatus, those calibration samples can be used to pose an additional learning problem where the inputs include the state parameters as well as the measured printed dot areas and the output is the printed dot area. Calibration samples are distinguished from training samples in that training samples are used to determine one or more parameters for the statistical learning system, whereas calibration samples are samples that may be presented to a trained system. Statistical learning systems have been described that estimate a printed dot area given a digital dot area. The estimated printed dot areas are used to generate a dot gain representation. It is to be understood that, in other embodiments, a dot gain value may be estimated by the statistical learning system. In still other embodiments, the statistical learning system may estimate a digital dot area, with a desired printed dot area being used as input.

Support vector machines are further described as an exemplary manner of employing a statistical learning system. Briefly, support vector machines are a kernel-based approach to statistical learning, see for example, Christopher J. C. Burges, "A tutorial on Support Vector Machines for pattern recognition", Data Mining and Knowledge Discovery, 2, pp. 121–167, Kluwer Academic Press, Boston (1998), Nello Cristianini and John Shawe-Taylor, "An Introduction to Support Vector Machines and other kernel-based learning methods" Cambridge University Press, Cambridge UK (2000), and Vladimir Vapnik, "The nature of statistical learning theory, second edition," Statistics for engineering and information science, Springer-Verlag, New York, N.Y. (2000).

The definition of the quadratic programming problem that for support vector learning is generally:

$$\max_{\alpha} W(\alpha) = \sum_{i=1}^{l} \alpha_i - \frac{1}{2} \sum_{i=1}^{l} \sum_{j=1}^{l} y_i y_j k(\vec{x}_i, \vec{x}_j) \alpha_i \alpha_j \quad (2.1)$$

$$0 \le \alpha_i \le C, \text{ for each } i$$

$$\sum_{i=1}^{l} y_i \alpha_i = 0$$

where l is the number of <x, y> samples, $k(\vec{x}_i, \vec{x}_j)$ is the kernel function of two sample input vectors $\vec{x}_i$ and $\vec{x}_j$, $y_i$ and $y_j$ are the sample output values, C is given, and $a_i$ are being optimized by the training process. Quadratic programming problems are generally known in the art and described, for example, in J. Platt, "Fast training of Support Vector Machines using sequential minimal optimization" in Advances in Kernel Methods-Support Vector Learning, ed. B. Scholkopf, C. Burges, and A. Smola, MIT Press (1998).

In general, and without being bound by theory, the quadratic programming problem is solved if and only if the Karush-Kuhn-Tucker (KTT) conditions are fulfilled and $Q_{ij}=y_i y_j k(\vec{x}_i, \vec{x}_j)$ is positive semi-definite. Such a point may be a non-unique and non-isolated optimum. The KKT conditions are particularly simple; the quadratic programming problem is solved when, for all i:

$a_i=0 \rightarrow y_i f(\vec{x}_i) \ge 1$, $0<a_i<C \rightarrow y_i f(\vec{x}_i)=1$, (2.2)

$a_i=C \rightarrow y_i f(\vec{x}_i) \le 1$.

where $f(\vec{x}_i)$ is the evaluation of the support vector machine at point $\vec{x}_i$, and is defined as:

$$f(\vec{x}_i) = \sum_{j=1}^{l} a_j k(\vec{x}_i, \vec{x}_j) \quad (2.3)$$

Those input samples with non-zero $a_i$, values at the end of training are generally called support vectors, and the samples where $a_i=C$ are generally called bound support vectors. In classification problems, these support vectors define the boundary between two classes, while the C parameter allows some "slack" in the system that permits samples to be on the "wrong" side of the decision boundary, which helps prevent or reduce over fitting to the input set. It also affects the size of the support vector set. However, C is unit-less and determining the "right" value for C is non-trivial.

LIBSVM is a library of support vector machine algorithms with high quality and efficient implementations for classification and regression problems, described for example in Chih-Chung Chang and Chih-Jen Lin, LIBSVM: a library for support vector machines (Sep. 14, 2002). LIBSVM supports four kernel functions:

linear: $\text{kernel}(\vec{u}, \vec{v}) = \vec{u}^T \cdot \vec{v}$ polynomial: kernel $(\vec{u}, \vec{v}) = (\gamma \vec{u}^T \cdot \vec{v} + \text{coef0})^{degree}$ radial basis function: kernel $(\vec{u}, \vec{v}) = e^{-\gamma |\vec{u}-\vec{v}|^2}$ sigmoid kernel $(\vec{u}, \vec{v}) = \tanh(\gamma \vec{u}^T \cdot \vec{v} + \text{coef0})$ The choice of which kernel function to use is generally based on a trade-off between accuracy and performance, and which kernels give rise to valid systems where an optimization problem is solvable. In general, any of the above kernel functions as well as others, may be used to predict dot gain tables, or printed-to-digital dot area relationships. In embodiments of the present invention described below, the radial basis function.(RBF) kernel is used, giving a two-dimensional SVM parameter space, C and γ. Other kernels require more or fewer parameters, resulting generally in a less, or more, complex parameter search.

Figure 6:
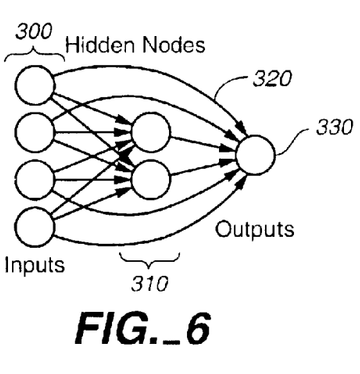
FIG. 6 depicts a schematic embodiment of a neural network architecture, according to an embodiment of the present invention.

In other embodiments, the statistical learning system used includes one or more neural networks. Neural networks are further described in Bishop, "Neural networks for pattern recognition," Oxford University Press (1995). In one embodiment, the neural network package nnet from the R statistical environment is used. R is a GNU implementation of the S/Splus environment as described, for example, in Ripley, "The R project in statistical computing," *MSOR Connections, the newsletter of the LTSN Maths, Stats & OR Network*, 1(1):23–25, February 2001. The nnet package uses standard feed-forward neural network architecture with a single hidden layer and logistic activation functions. The networks are fitted using BFGS quasi-Newton optimization, with gradients supplied by back propagation. In other embodiments, other neural network packages or methods are used, and other fitting methodologies are used in other embodiments. FIG. 6 depicts a schematic embodiment of a feedforward NN neural network architecture. Input nodes 300 are connected to each of hidden nodes 310, and linear (skip) connections, such as connection 320, are provided between input nodes 300 and output node 330. Output node 330 is set to have linear activation. Each hidden node is connected to output node 330, as in FIG. 6. In the embodiment depicted in FIG. 6, the connection weight between node i and node j is represented by $w_{ij}$. Each network node is indexed: index 0 is a bias input with constant value 1, indices $1, \ldots, N_{in}$ are the input nodes, indices $(N_{in}+1), \ldots, (N_{in}+N_{hid})$ are the hidden nodes, and $N_{in}+N_{hid}+1$ is the output node. If no connection exists between nodes i and j, then $w_{ij}$ is fixed as a constant 0.

The neural network embodiment in FIG. 6 operates generally as follows. Let $x_i$ be the input to any node i: input, hidden or output, and $z_i$ the output from that node. The input and output for the input nodes are identical. The input and output functions for hidden node i in terms of previous hidden nodes and inputs are shown in Equations (3) and (4) respectively. Since linear output nodes are used in the embodiment shown in FIG. 6, the output $z_i$ for output node $i=N_{in}+N_{hid}+1$ is just $x_i$.

$$x_i = \sum_{j=0}^{i-1} w_{ij} z_j \quad (3)$$

$$z_i = \frac{\exp(x_i)}{1 - \exp(x_i)} \quad (4)$$

Embodiments of the present invention use between 1 and 10 hidden nodes, in one embodiment 2 hidden nodes, and networks are fitted using weight decay regularization with decay parameter 0.001. In practice any number of hidden nodes such as 2, 3, 4, 5, 6, 7, 8, 9, or 10 hidden nodes or even a greater number of hidden nodes may be utilized. Weight decay regularization is further described in Bishop, "Neural networks for pattern recognition," Oxford University Press (1995).

Statistical learning systems comprise hardware and/or software, or any combination thereof, to sample one or a plurality of state parameters associated with a printing apparatus and compute the linear or non-linear problem, resulting in an estimate of a printed dot area generated by a particular digital dot area (or vice versa, or simply to estimate a value for dot gain). Accordingly, a statistical learning system includes a computer-readable memory and processor sufficient to perform these operations in a timeframe suitable for use with the printing apparatus. In one embodiment, a single support vector machine engine is provided requiring a few kilobytes of memory or less, and a few kiloflops or less or processor power to generate a dot gain representation.

Statistical learning systems according to the present invention are trained on a plurality of training samples (step 100 in FIG. 4). Training samples in the present invention comprise a measured printed and digital dot area pair with the corresponding values for one or more state parameters. For example, in one embodiment a statistical learning system is trained with training samples including a digital dot area value, a printed dot area value, a developer voltage value, blanket counter value, and foil counter value. In another embodiment, a statistical learning system is trained with training samples including values for the following parameters: digital dot area, printed dot area, developer voltage, optical density, ink density, ink conductivity, ink temperature, imaging oil temperature, imaging oil composition, drum temperature, drum blanket counter, Foil background qualifier, machine temperature, corona voltage, corona current, grid voltage, grid current, screen and Foil vlight/vbackground. In other systems where other state parameters are used, the training samples would contain values for those state parameters, which may be one, all, or a subset of the above-identified parameters, or may be a different parameter or include different parameters. Training samples are generally provided for each ink (separation) of interest, in one embodiment, training samples are provided for each of four inks, or separations. Printing apparatuses having three, four, five, six, seven, or another number of inks, or separations, may also be accommodated by providing training samples for each ink. In one embodiment, yellow, magenta, cyan, and blank inks are used. During the training process, the statistical learning system determines a set of statistical learning system parameters for use in the statistical learning problem that fit, or agree with, the training sample values. Methods for finding a set of parameters are known in the art.

Once a set of statistical learning system parameters has been determined for a given statistical learning system, the system can be used to dynamically estimate a printed dot area for a given digital dot area (or vice versa, or estimate a dot gain value). During operation, a control system uses the dot gain representation generated, at least in part, by the statistical learning system, to determine the digital dot area needed to achieve a particular printed dot area. Accordingly, the statistical learning system receives information regarding one or more present parameters, such as, in one embodiment, the developer voltage, Foil age, and blanket age. In another embodiment, the statistical learning system receives information regarding developer voltage, optical density, ink density, ink conductivity, ink temperature, imaging oil temperature, imaging oil composition, drum temperature, drum blanket counter, Foil background qualifier, machine temperature, corona voltage, corona current, grid voltage, grid current, screen and Foil vlight/vbackground. In other embodiments, one or a subset of the above-identified parameters are received by the statistical learning system. In other embodiments, different parameters are used or included. The state parameters are then modified using the statistical learning system parameters to result in an estimated printed dot area resulting from a specified digital dot area, in one embodiment.

Once a statistical learning system has estimated one or a plurality of printed dot areas, each corresponding to a particular digital dot area, a representation is generated containing these relationships. During operation, in one embodiment, the printing apparatus receives a particular printed dot area to be printed and utilizes a dot gain table generated by the statistical learning system to identify the proper digital dot area to use to print the received printed dot area. Once the digital dot area value has been determined, the method may further comprise setting at least one control parameter to achieve that digital dot area value.

In some embodiments of the present invention, the statistical learning system continues to adapt, periodically or aperiodically further training the system on further sample points to refine the accuracy of the prediction (steps 220 and 230 in FIG. 5, in one embodiment). For example, in some embodiments, after a statistical learning system has been trained, calibration samples may be taken. In one embodiment an optical densitometer is used to read printed dot area values from a swatch of uniform density in a single color, generating calibration samples. Fifteen such swatches may be printed on a single paper, in one embodiment Therefore, in a press having seven separations, or inks, up to two digital dot areas may be measured for each separation in a single sheet The resultant values are used along with the machine state as input to the statistical learning system to predict the remainder of the dot gain look-up table. Of course, the number of swatches printed on a paper, as well as the number of training samples will vary according to the application and the accuracy desired.

In one embodiment, training samples comprise data taken from an HP Indigo digital press. Specifically, forty-four dot gain tables, each comprising fifteen values are stored, for each of four inks. The number of dot gain tables and samples used to train the statistical learning system may vary according to the amount of data available, the number of variables captured, and the resultant accuracy of the prediction system. For example, in another embodiment, 1,076 dot gain tables are used to train a statistical learning system. In one embodiment, at least 10 tables per system parameter are generated, although smaller sets can be used if results are appropriately cross-validated. Each dot gain table is associated with information on system parameter values of interest, including some or all of the state parameters described above. In one embodiment, three system parameter values are used: developer voltage, blanket counter, and Foil counter, described above. In another embodiment, 17 parameter values are used: developer voltage, optical density, ink density, ink conductivity, ink temperature, imaging oil temperature, imaging oil composition, drum temperature, drum blanket counter, Foil background qualifier, machine temperature, corona voltage, corona current, grid voltage, grid current, screen and Foil vlight/vbackground.

Accordingly, in one embodiment, for each of four inks (separations) and each of fifteen digital dot area values, forty-four samples are stored. In another embodiment, for each ink, 1,076 samples are taken and optionally stored. The embodiment using forty-four samples and three state parameters (developer voltage, blanket counter, and Foil counter) is described further for exemplary purposes. Each sample contains or includes the three machine state parameters and its associated printed dot area value. This results in sixty statistical learning problems, in the embodiment with forty-four samples, each with three input parameters, one output parameter, and forty four samples. Accuracy of the method according to the present invention is estimated using leave-one-out cross-validation, a well-known method for estimating the accuracy of a statistical learning method. For each point in the dataset, the point is removed from the dataset, the system is trained using the remaining points, and then the value of the point that was removed is predicted. The overall prediction error is estimated as a function of the prediction errors for each point. An alternative is to use N-fold cross-validation, where the points are assigned to "folds", and each for each fold, the fold is removed from the dataset, the system is trained on the remaining points, and then the values for the points that were withheld are predicted. In this embodiment, leave-one-out cross-validation is used to evaluate the accuracy of the statistical learning system by calculating an expected prediction error for each of the sixty problems. The method used to evaluate the accuracy may vary, as known in the art, and the particular method used will be affected by the desired accuracy of the calculation and the number of training samples available, as well as other factors such as computation efficiency. An analogous method is performed with the embodiment containing 1,076 training tables and using 17 state parameters of interest Embodiments of the present invention generally result in predicted digital dot areas with median absolute error, as computed using leave-one-out cross validation of 2% of the maximal dot area or less. Other embodiments achieve better or worse performance, based on the state of the printing apparatus and the extent of the training.

As described above, in some embodiments of the present invention support vector machines (SVM) are trained and used to estimate a printed dot area resulting from a specified digital dot area. Use of a support vector machine requires the selection of a kernel function, and the associated kernel function parameters. During the training process optimal statistical learning system parameters will be chosen that provide a fit to training samples. In general, this requires evaluating the kernel, or problem, at a plurality of parameter settings. That is, a printed dot area is calculated corresponding to a desired printed dot area using a plurality of parameter values in the kernel. Generally, the parameter values resulting in a calculated printed dot area closer to the actual printed dot area will be more optimal than parameter values resulting in a calculated printed dot area further from the actual printed dot area of a training sample. A variety of methods exist in the art for locating optimal parameter values for use in the kernel during operation including exhaustive grid scans and gradient-based methods. Similarly, a variety of methods exist in the art for evaluating the parameter's effectiveness, including but not limited to N-fold cross-validations, leave-one-out methods, and Dietterich's 5x2cv test.

The methods described herein may be used to produce printed media, such as printed images on paper, glossy paper, transparency material, and other media. Accordingly, methods of the present invention find use in printing, for example, posters, photographs, advertisements, papers, newspapers, magazines, corporate reports, posters, art reproductions, maps, and other documents.

The systems and methods find use in conjunction with a wide variety of printing apparatuses—including, but not limited to, laser printers, inkjet printers, bubblejet printers, printing presses, digital printing presses, and the like. In particular, systems and methods of the present invention may include, or be used in conjunction with, the HP Indigo Press. Different printing apparatuses having different mechanisms for printing will have different state parameters of interest, as described further above, however the application of statistical learning methods to the determination of printed dot area remains.

The invention may advantageously implement the methods and procedures described herein in hardware, software, or a combination thereof. Some methods and procedures may be performed in whole or in part on a general purpose or special purpose computing device, such as a device having a processor for executing computer program code instructions and a memory coupled to the processor for storing data and/or commands. It will be appreciated that the computing device may be a single computer or a plurality of networked computers and that the several procedures associated with implementing the methods and procedures described herein may be implemented on one or a plurality of computing devices. Ultimately, the computing devices are in communication with one or more printing apparatuses. The communication may be direct, such that the processor has a direct electrical or optical connection to the printing apparatus, or may be over one or more networks or wireless interfaces.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for determining dot gain, said method comprising:

providing at least one state parameter as an input to a statistical learning system; and estimating, using said statistical learning system, a plurality of printed dot areas, each corresponding to a specified digital dot area.

2. A method according to claim 1, further comprising: measuring said at least one state parameter.

3. A method according to claim 1, wherein said state parameter is a state parameter associated with a digital printing press.

4. A method according to claim 1, wherein said state parameter is chosen from a group of state parameters consisting of developer voltage, foil age, and blanket age.

5. A method according to claim 1, wherein said state parameter is any one parameter or any combination of parameters selected from a group of state parameters consisting of developer voltage, optical density, ink density, ink conductivity, ink temperature, imaging oil temperature, imaging oil composition, drum temperature, drum blanket counter, foil background qualifier, machine temperature, corona voltage, corona current, grid voltage, grid current, screen and foil vlight/vbackground.

6. A method according to claim 1, wherein a plurality of measured state parameters are provided as an input to said statistical learning system.

7. A method according to claim 1, wherein said state parameters comprise developer voltage, foil age, and blanket age.

8. A method according to claim 1, wherein said statistical learning system comprises a linear regression system.

9. A method according to claim 1, wherein said statistical learning system comprises a non-linear system.

10. A method according to claim 1, wherein said statistical learning system comprises a support vector machine.

11. A method according to claim 1, wherein said statistical learning system comprises a genetic programming system.

12. A method according to claim 1, wherein said statistical learning system comprises a neural network.

13. A method for generating a dot gain lookup table comprising a plurality of printed dot area values, each corresponding to a specified digital dot area, said method comprising:

training a statistical learning system on a plurality of sampled points, each sampled point comprising at least one measured printed dot area for a corresponding digital dot area;

providing at least one state parameter and at least one measured printed dot area as an input to said trained statistical learning system; and estimating, using said statistical learning system, a plurality of printed dot areas, each corresponding to a specified digital dot area.

14. A method according to claim 13, further comprising: measuring said at least one state parameter.

15. A method according to claim 13, further comprising measuring at least one printed dot area corresponding to a specified digital dot area;

providing said measured printed dot area and said corresponding digital dot area to said statistical learning system; and updating at least one dot gain lookup table based on said measured printed dot area.

16. A method according to claim 13, wherein said training comprises identifying a value for at least one statistical learning system parameter in said statistical learning system.

17. A method according to claim 16, wherein said training comprises identifying a value for three statistical learning parameters in said statistical learning system.

18. A system for determining a digital dot area, the system comprising:

a statistical learning system configured to receive at least one state parameter and generate a dot gain representation; and a control generation module configured to receive a specified printed dot area, access said dot gain representation, and determine a digital dot area corresponding to said specified printed dot area.

19. A system according to claim 18 wherein said dot gain representation comprises a dot gain lookup table.

20. A system according to claim 18 wherein said statistical learning system is further configured to receive a plurality of training samples.

21. A system according to claim 20 wherein said statistical learning system is further configured to receive measured dot gain information.

22. A system according to claim 18, wherein said state parameter is any one parameter or any combination of parameters selected from a group of state parameters consisting of developer voltage, optical density, ink density, ink conductivity, ink temperature, imaging oil temperature, imaging oil composition, drum temperature, drum blanket counter, foil background qualifier, machine temperature, corona voltage, corona current, grid voltage, grid current, screen, foil vlight/vbackground, and combinations thereof.

23. A system according to claim 18, wherein said statistical learning system is chosen from a group of systems consisting of: a linear regression system, a support vector machine, a genetic programming system, and a neural network.

* * * * *